United States Patent [19]

Anderson

[11] Patent Number: 4,969,702
[45] Date of Patent: Nov. 13, 1990

[54] LASER PIGTAIL ASSEMBLY AND METHOD OF MANUFACTURE

[75] Inventor: Duwayne R. Anderson, Redmond, Oreg.

[73] Assignee: Tektronix, Inc., Beaverton, Oreg.

[21] Appl. No.: 355,586

[22] Filed: May 22, 1989

[51] Int. Cl.$^5$ .............................. G02B 6/36; G02B 7/26
[52] U.S. Cl. ................................ 350/96.20; 350/96.17; 350/96.18
[58] Field of Search ................ 350/96.18, 96.17, 96.20

[56] References Cited

U.S. PATENT DOCUMENTS

| | | | |
|---|---|---|---|
| 4,186,995 | 2/1980 | Schumacher | 350/96.18 |
| 4,237,474 | 12/1980 | Ladany | 357/81 |
| 4,307,934 | 12/1981 | Palmer | 350/96.18 |
| 4,500,165 | 2/1985 | Scholl et al. | 350/96.20 |
| 4,725,128 | 2/1988 | Bornzin et al. | 350/96.17 |
| 4,844,577 | 7/1989 | Ninnis et al. | 350/96.29 |

Primary Examiner—William L. Sikes
Assistant Examiner—Robert E. Wise
Attorney, Agent, or Firm—William K. Bucher

[57] ABSTRACT

An optical pigtail assembly is described wherein the focusing lens through which the laser diode output passes has its planar surface facing the laser instead of its convex surface. This configuration provides greater coupling efficiency when launching 850 nm light from the laser into an optical fiber. In the method of manufacturing the optical pigtail assembly, ultraviolet, UV, cured epoxy is used to bond the elements of the pigtail assembly together. The use of UV cured epoxy overcomes environmental problems and high capital equipment costs associated with other types of laser pigtail assembly manufacturing methods.

6 Claims, 1 Drawing Sheet

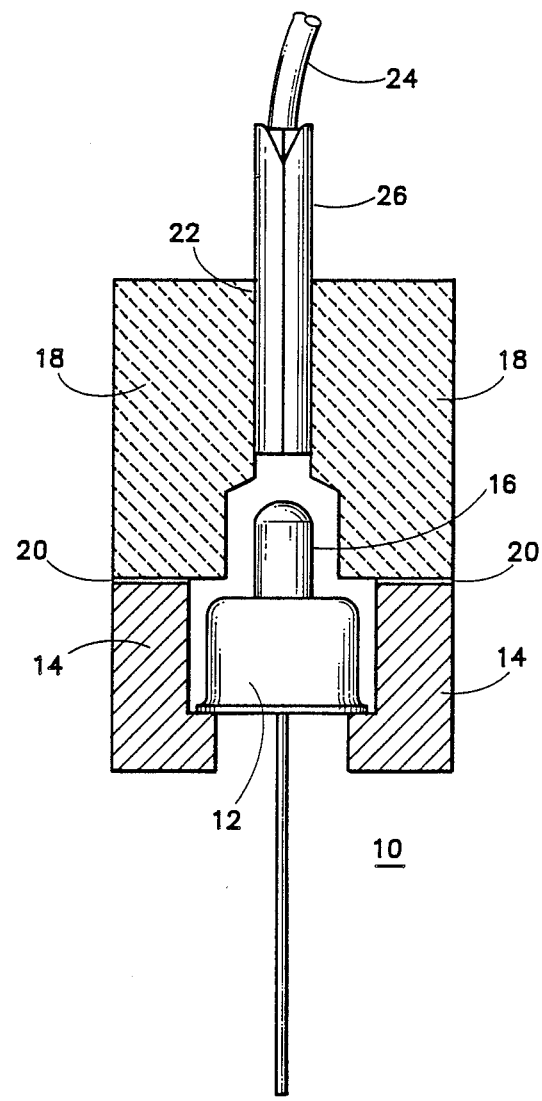

LASER PIGTAIL ASSEMBLY AND METHOD OF MANUFACTURE

BACKGROUND OF THE INVENTION

The present invention relates to optical pigtail assemblies and more specifically to a laser pigtail assembly for use with a multimode laser and its method of manufacture.

Optical pigtail assemblies are used for coupling the output from an optical source, such as a light emitting diode, laser diode, and the like, to an optical waveguide, such as a fiber optic cable or the like. The optical waveguide is positioned within the pigtail assembly for maximum optical power transfer from the optical source to the waveguide.

In a typical single mode laser pigtail assembly, the laser diode, usually contained in a metal can, is soldered or laser welded to a base member. A gradient index lens, such as a plano-convex lens or a plano-plano lens, is fixedly positioned adjacent to a window in the laser diode can. When using a plano-convex lens, the convex end of the lens is positioned toward the laser to magnify and focus the output of the laser diode. A cap member is placed over the laser diode and gradient index lens. The cap member has a central aperture into which is secured an optical fiber. The optical fiber can be placed directly into the aperture or, alternately, the fiber can be placed in a ferrule and then secured in the aperture. The optical fiber and the cap member are positioned vertically and horizontally with respect to the output of the laser diode for maximum optical power transfer from the laser diode to the optical fiber and then secured.

An alternative method of manufacturing such a laser pigtail assembly is to use a long term curing epoxy to assemble the pigtail assembly parts. The manufacturing steps are similar to the soldering or laser welding process in that the optical fiber is aligned with respect to the laser diode for maximum power transfer. In the long term curing epoxy process, a layer of epoxy on the order of 50 microns, is applied between the parts being assembled. The assembled parts are then set aside until the epoxy is cured. Low volume output is one disadvantage of this process since substantial curing time is required for each assembly step. In addition, both the epoxy process and the laser welding process require large capital investments. For the epoxy process, a humidity and vibration controlled room is required while the laser welding process requires expensive laser welding machines.

What is needed is a laser pigtail assembly with high optical power coupling efficiency and good thermal performance that is manufactured using a high output and low cost method that does not require large capital investments.

SUMMARY OF THE INVENTION

Accordingly, the present invention is a method of manufacturing an optical pigtail assembly using an ultraviolet cured epoxy wherein the thickness of the ultraviolet cured epoxy between the bonded elements is on the order of 10 microns and the epoxy is exposed to ultraviolet light after each step to promote curing. An optical source, such as a laser diode, is fixedly positioned on a support member. A focusing member, such as a gradient index lens, is fixedly positioned with respect to the optical source so that the output of the optical source passes through the gradient index lens. A cap member having a central aperture therein and a mounting surface normal to the aperture is positioned over the optical source and the focusing member with the mounting surface in contact with the support member. An optical waveguide, such as a fiber optic cable, is positioned within the central aperture of the cap member. The cap member and the optical waveguide within the cap member are fixedly positioned with respect to the output of the optical source passing through the focusing member to provide maximum optical power transfer between the optical source and the optical waveguide.

In a preferred embodiment of the optical pigtail assembly, the optical source is fixedly positioned on the support member. The focusing member has a planar surface and an opposing convex surface with the planar surface fixedly positioned with respect to the optical source so that the output of the optical source impinges on the planar surface. The cap member has a mounting surface and a central aperture normal to the mounting surface into which is positioned the optical waveguide. The cap member is positioned over the optical source and the focusing member with the mounting surface in contact with the support member. The optical waveguide within the cap member and the cap member are positioned with respect to the output of the optical source passing through the focusing member to provide the maximum optical power output from the optical source to the optical waveguide.

The objects, advantages and novel features of the present invention are apparent from the following detailed description when read in conjunction with the appended claims and attached drawings.

BRIEF DESCRIPTION OF THE DRAWINGS

The FIG. is a partial cross-sectional view of the optical pigtail assembly of the present invention.

DESCRIPTION OF THE PREFERRED EMBODIMENT

Referring to the Figure, there is shown an optical pigtail assembly 10 having an optical source 12, such as a laser diode, light emitting diode, or the like, fixedly positioned on a support member 14. The laser diode 12 is contained in a metal can having a window therein permitting the output of the laser light from the can. In optical telecommunications transmissions, the laser diode 12 generates an optical output generally at wavelengths of 1300nm and 1550nm for single mode transmissions and 850nm for multimode transmissions. A focusing member 16, such as a gradient index lens having a planar surface and an opposing convex surface, is positioned with respect to the laser diode 12 such that the output from the laser 12 passes through the lens 16. In the preferred embodiment of the invention, the gradient index lens 16 is positioned with its planar surface aligned with the multimode laser diode 12 so that the output from the multimode laser 12 impinges on the planar surface of the lens 16. This configuration provides a linear magnification of around one, slightly less spherical aberrations, and improves the coupling efficiency from the multimode laser 12 to both single mode and multimode fibers 24. In a conventional single mode laser pigtail assembly, the convex surface of the gradient index lens 16 is positioned toward the single mode laser diode 12, which linearly magnifies the optical output of the diode 12 nearly four times. This linear magnification is advantageous when launching the output of laser diode 12 into a single mode fiber.

A cap member 18 having a mounting surface 20 and a central aperture 22 normal to the mounting surface is positioned over the laser diode 12 and the lens 16 with the mounting surface 20 in contact with support member 14. An optical waveguide 24, such as a fiber optic cable, is placed within a ferrule 26 and positioned within the central aperture 22 of cap member 18. To position the optical fiber 24 within the ferrule 26, the protective sheathing around the optical fiber 24 is removed and the fiber is positioned within a ferrule 26 with the end of the optical fiber 24 flush with the end of the ferrule 26. The optical fiber 24 within aperture 22 and the cap member 18 are positioned with respect to the laser diode 12 output using three degrees of freedom, i.e. x, y, and z directions where the x and y directions are in the plane of the cap mounting surface 20 and the z direction is parallel to the axis of the central aperture 22, to provide maximum optical power transfer from the laser diode 12 to the optical fiber 24. In a single mode laser pigtail assembly, a single mode optical fiber having a diameter on the order of 6 microns is used whereas in a multimode laser pigtail assembly a multimode optical fiber having a diameter in the range of 62 microns is used.

The manufacturing process for the above described laser pigtail assemblies use ultraviolet, UV, cured epoxy for bonding adjoining parts together. The use of UV cured epoxy provides distinct advantages over other methods of assembly. The thickness of the epoxy layer between adjacent parts is on the order of 10 microns. This thickness of epoxy is generally immune from environmental problems associated with other kinds of epoxies, such as moisture absorption and the like. In addition, there are no fillets of epoxy between parts as are associated with longer curing epoxies. This essentially places the parts in intimate contact with each other. Further, the use of UV cured epoxy lends itself to mass production of pigtail assemblies since curing times are on the order of fifteen minutes instead of sixteen hours as is the case with other types of epoxies. This process also does not require environmentally controlled rooms for assembly or expensive equipment for implementation.

The manufacturing process begins with fixedly positioning the laser diode can 12 to the support member 14. The support member is made of 416 stainless steel, which has a thermal coefficient very close to that for borosilicate glass that is used for other elements in the pigtail assembly. When using a support member 14 made of stainless steel, the laser diode can 12 is secured to the support member with long term curing epoxy, such as a gyro grade epoxy used in the aircraft industry. The assembled parts are exposed to a temperature of 95 degrees centigrade for two hours to cure the epoxy. If the support member is made of a glass material, such as borosilicate glass, then an ultraviolet cured epoxy can be used to secure the laser diode can 12 to the support member 14. These parts are exposed to ultraviolet light to promote the curing process of the epoxy. The gradient 16 is then fixedly positioned with respect to the laser diode 12 so that the output of the laser 12 passes through the lens 16. In the multimode laser pigtail assembly, the planar surface of the lens 16 is epoxied directly onto the window of the laser can.

The optical fiber 24 is then prepared for insertion into the central aperture 22 of the cap member 18. The protective sheathing around the optical fiber 24 is removed and the fiber is epoxied into a borosilicate glass ferrule 26. The end face of ferrule 26 having the optical fiber 24 exposed therein is then polished. The ferrule 26 containing the optical fiber 24 is then positioned in the central aperture 22 of cap member 18 The cap member 18 is the positioned over the laser diode 12 and lens 16 with the mounting surface 20 of the cap member 18 in contact with the support member 14. The end of the optical fiber 24 opposite the ferrule 26 is connected to appropriate test equipment for determining the optical power level emanating from the optical fiber 24. Power is applied to the laser diode 12 and the optical fiber 24 in the cap member 18 is positioned for the maximum power transfer from the laser diode 12 to the optical fiber 24 as determined by the optical power level on the test equipment. The ferrule 26 containing the optical fiber 24 is then removed and epoxy is applied to the ferrule 26 and the positioning step is repeated for maximum power transfer. When the optical fiber 24 is properly aligned the assembly is exposed to the UV light to promote the curing of the epoxy. Alternately, the UV epoxy can be applied prior to the first insertion of the ferrule 26 into the central aperture 22. The optical fiber 24 can then be positioned for maximum optical power transfer and exposed to the UV light, thus eliminating one step.

Following the positioning and bonding of the optical fiber 24 in the cap member 18, epoxy is applied to the mounting surface 20 of cap member 18 and the cap member is positioned on the support member 14 with the optical fiber 24 in approximate alignment with the laser diode 12 and lens 16. The cap member 16 is positioned horizontally on the support member 14 for maximum optical power transfer from the laser diode 12 to the optical fiber 24 as determined by the test equipment. The cap member 18 is then bonded to the support member 14 by exposing the epoxy to UV light.

A method has been described for manufacturing an optical pigtail assembly that uses ultraviolet cured epoxy as the bonding agent for the various parts in the assembly. The use of UV epoxy substantially reduces the manufacturing time for such an assembly and produces a part that is less susceptible to environmental degradation. Additionally, a laser pigtail assembly has been described using a multimode laser diode wherein the gradient index lens has been reversed so that the planar surface of the lens is positioned toward the laser in contrast to general practice and manufacturers' recommendations. Spherical aberrations are reduced with this configuration and the coupling efficiency between the multimode laser and the optical fiber is increased These and other aspects of the present invention are set forth in the appended claims.

I claim:

1. An assembly for coupling an output from an optical source to a single-mode optical fiber waveguide having an end face for receiving the output from the optical source comprising:

a support member having the optical source fixedly positioned thereto;

a gradient index lens positioned with respect to the optical source for directing the output of the optical source to the end face of the single-mode optical fiber waveguide, the gradient index lens being bonded to the optical source using an ultraviolet cured epoxy having a thickness of less than 10 microns; and a cap member having a central aperture and a mounting surface normal to the aperture with the single-mode optical fiber waveguide being positionable within the aperture providing a first degree of positioning freedom and the mounting surface of the cap member being positionable on the support member providing second and third degrees of positioning freedom, the single-mode optical fiber waveguide being aligned using the three degrees of positioning freedom to the output of the optical source passing through the gradient index lens to provide optimum power transfer from the optical source to the single-mode optical fiber waveguide, the single-mode optical fiber waveguide, the cap member, and the support member being bonded together using an ultraviolet cured epoxy having a thickness of less than 10 microns.

2. The coupling assembly of claim 1 wherein the gradient index lens has a planar surface and an opposing convex surface with the planar surface being positioned with respect to the optical source so that the output of the optical source impinges on the planar surface.

3. An optical coupling assembly for a single-mode optical fiber waveguide comprising:

a support member having an aperture there through and having first and second mounting surfaces;

an optical source having a base and a window with the output of the optical source passing through the window and the base being fixedly positioned on the fist mounting surface of the support member;

a gradient index lens having a planar surface and a convex surface for directing the output of the optical source to an end face of the single-mode optical fiber waveguide with the planar surface bonded to he window of the optical source using an ultraviolet cured epoxy having an thickness of less than 10 microns;

a ferrule member having a central aperture into which is bonded an optical fiber waveguide using an ultraviolet cured epoxy having an thickness of less than 10 microns; and a cap member having a central aperture and a mounting surface normal to the aperture with the ferrule member being positionable within the cap aperture providing a first degree of positioning freedom and the mounting surface of the cap being positionable on the second mounting surface of the support member providing second and third degrees of positioning freedom, the positioning of the ferrule member within the cap member and the cap member on the support member providing the three degrees of positioning freedom for aligning the single-mode optical fiber waveguide to the output of the optical source passing through the gradient index lens to provide optimum power transfer from the optical source to the single-mode optical fiber waveguide, the ferrule member, the cap member and the support member being bonded together using an ultraviolet cured epoxy having a thickness of less than 10 microns.

4. A method of manufacturing a optical coupling assembly having a single-mode optical fiber waveguide comprising the steps of:

bonding an optical light source having a base and a window for light output to a support member with the base of the optical light source being bonded to the support member;

bonding a gradient index lens to the window of the light source using an ultraviolet cured epoxy having an thickness of less than 10 microns;

aligning a single-mode optical fiber waveguide in a central aperture of a cap member and aligning the cap member on the support member to produce an optimum power transfer from the optical light source to the single-mode optical fiber waveguide; and bonding the single-mode optical fiber waveguide in the cap member and the cap member to the support member using an ultraviolet cured epoxy having an thickness less than 10 microns.

5. The method of manufacturing an optical coupling assembly of claim 4 wherein each ultraviolet cured epoxy bonding step further comprises the step of exposing the epoxy to an ultraviolet light to promote curing.

6. The method of manufacturing an optical coupling assembly of claim 4 wherein the bonding of the gradient index lens having a planar surface and an opposing convex surface adjacent to the light source further comprises the step of placing the planar surface of the gradient index lens adjacent to the light window of the optical source.

* * * * *